US008810652B2

(12) United States Patent
Braune et al.

(10) Patent No.: US 8,810,652 B2
(45) Date of Patent: Aug. 19, 2014

(54) METHOD AND APPARATUS FOR MONITORING A REGION

(75) Inventors: Ingolf Braune, Gundelfingen (DE); Bernd Rothenberger, Breisach (DE)

(73) Assignee: Sick AG, Waldkirch (DE)

(*) Notice: Subject to any disclaimer, the term of this patent is extended or adjusted under 35 U.S.C. 154(b) by 1784 days.

(21) Appl. No.: 11/986,990

(22) Filed: Nov. 26, 2007

(65) Prior Publication Data
US 2008/0316310 A1 Dec. 25, 2008

(30) Foreign Application Priority Data
Nov. 29, 2006 (EP) .................................. 06024677

(51) Int. Cl.
H04N 7/18 (2006.01)
F16P 3/14 (2006.01)
G08B 13/196 (2006.01)
G06K 9/20 (2006.01)
H04N 17/00 (2006.01)

(52) U.S. Cl.
CPC .................. *G06K 9/2036* (2013.01); *F16P 3/14* (2013.01); *G08B 13/1961* (2013.01)
USPC .......................................... 348/143; 348/175

(58) Field of Classification Search
USPC .......................................... 348/143; 382/103
See application file for complete search history.

(56) References Cited

U.S. PATENT DOCUMENTS

| | | | |
|---|---|---|---|
| 6,711,279 B1 * | 3/2004 | Hamza et al. ................. | 382/103 |
| 2004/0057600 A1 * | 3/2004 | Niwa ............................ | 382/103 |
| 2005/0232466 A1 * | 10/2005 | Kampchen et al. ........... | 382/103 |
| 2006/0002588 A1 * | 1/2006 | Hagihara et al. .............. | 382/103 |
| 2006/0045354 A1 * | 3/2006 | Hanna et al. .................. | 382/224 |
| 2006/0140485 A1 * | 6/2006 | Hing et al. .................... | 382/219 |
| 2007/0115485 A1 * | 5/2007 | Ong .............................. | 356/614 |

FOREIGN PATENT DOCUMENTS

| | | |
|---|---|---|
| DE | 35 25 265 A1 | 1/1987 |
| DE | 196 03 935 A1 | 8/1997 |
| DE | 297 14 438 U1 | 10/1997 |
| DE | 196 44 278 A1 | 5/1998 |
| DE | 299 11 390 U1 | 8/1999 |
| DE | 100 26 710 A1 | 12/2001 |
| EP | 1065521 A1 | 3/2001 |
| JP | 08-55288 A | 2/1996 |
| JP | 11-306449 A | 11/1999 |
| WO | WO 02/41272 A2 | 5/2002 |

* cited by examiner

*Primary Examiner* — Joseph Greene
(74) *Attorney, Agent, or Firm* — Kilpatrick Townsend & Stockton LLP

(57) ABSTRACT

A method and device for monitoring a monitored area with at least one camera and in which the monitored area has a contrast strip with at least one bright partial strip and/or at least one dark partial strip that extend in the longitudinal direction. A control unit recognizes the obscuration of a minimum area of the bright partial strip and/or the dark partial strip as the entry of an object into the monitored area. The control unit detects from an image of the camera the obscuration in columns which are oriented transverse to the contrast strip. A violation of the signature of the contrast strip is recognized when a first minimum number of bright pixels between the bright beginning and the bright end of the bright partial strip and/or a second minimum number of dark pixels between the dark beginning and the dark end of the dark partial strip in the respective columns, and the obscuration of the minimum area as the obscuration of a predetermined number of side-by-side columns have been detected.

18 Claims, 2 Drawing Sheets

METHOD AND APPARATUS FOR MONITORING A REGION

RELATED APPLICATIONS

This application claims the priority of European Patent Application No. 06024677.4 filed Nov. 29, 2006, the disclosure of which is incorporated herein by reference.

BACKGROUND OF THE INVENTION

The invention relates to a device and a method for monitoring a monitored area or region.

Monitoring systems are used in a variety of applications in order to monitor in an automated manner changes in the monitored area. One such application is to protect a hazardous region where the entry of an object into the region is detected and classified according to pre-established rules that establish whether the detection of the object should trigger a warning signal or, for example, turn off a protected machine. This type of access control is predominantly implemented with light grids or laser scanners, but can also be achieved with a camera.

A direct digital recognition of the object is expensive and can be unreliable. For this reason a reflector foil is placed in the monitored area for positively detecting when it is covered and/or obscured by the object. Frequently such a reflector foil is retro-reflective in order to reduce the dependence on ambient lighting.

To detect bright as well as dark objects, the reflector foil is often covered with a pattern of reflecting and non-reflecting areas in order to provide more contrast. For example, dark clothing in front of the reflector and bright clothing or reflective marks on work clothes in front of the non-reflecting background can both be reliably detected.

DE 199 38 639 B4 discloses the use of a variety of reflector patterns in a monitoring system. In order to teach and monitor the position of the reflector patterns, markings are used that have to be recognized automatically by way of a complex definition and placement. In addition, certain manipulations or interferences with the reflector pattern cannot be detected. For example, an area of a shaft which does not have markings cannot be detected. A simple and fast evaluation of the obscurations is not disclosed.

A conventional evaluation of the presence of the reflector allows only a very reduced manipulation detection and provides almost no chance to detect geometric changes in the reflector position. However, above all the evaluation has to be fast and reliable in order to fulfill a protective function.

BRIEF SUMMARY OF THE INVENTION

It is therefore an object of the invention to enable fast and reliable evaluations.

The solution has the advantage that the evaluation can be compressed and quickly performed with a characteristic signature. However, this in no way compromises accuracy. The method reliably detects both dark and bright objects. A reflector strip facilitates object recognitions at lower local spatial pixel resolutions as compared to other reflector patterns.

The underlying concept of this solution is that the essential information of the elongated contrast strip can be encoded in a relatively simple signature. After teaching and learning the signature, objects can be reliably detected with a relatively simple evaluation method.

The control unit is preferably designed for a teaching or learning phase, in which the values—bright beginning, bright end, dark beginning and dark end of the contrast strip—which define the signature of the contrast strip, are determined for each column and filed in a memory. The teaching phase generates the signatures for the next phase of the evaluation process. By starting a teaching phase prior to the initial operation, or at any time thereafter, the device is automatically and effortlessly adapted to the prevailing conditions.

In an even more preferred embodiment the control unit is also designed to determine the signature of the contrast strip during the teaching phase as follows:

for each column, count how often there exists a signature—bright beginning, bright end, dark beginning and dark end, select the area as part of the contrast strip in which the most side-by-side columns exhibit this signature exactly once, extend the part of the contrast strip in both directions of the strip as far as possible.

In this way the contrast strip is detected automatically, even if reflecting objects are in the viewing range of the camera. The device therefore automatically adjusts itself to the prevailing conditions. The contrast strip is reliably detected in the area by adequately detecting the bright-dark transitions. By covering only part of the area of the contrast strip, the device is forced to monitor only a portion of the maximally possible monitored area.

As an alternative, the control unit can determine in the teaching phase the signature of the contrast strip as follows:

for each column, count how often a signature, namely a bright beginning, a bright end, a dark beginning and a dark end, is present, find areas that are part of the contrast strip where side-by-side columns have this signature, extend each part of the contrast strip as far as possible in both directions of the strip, select the strip section that is the longest after this extension.

This alternative has the advantage that the longest section of the contrast pattern is found even when the size of the initially determined parts of the contrast pattern are insufficient for this detection.

Advantageously an additional dark partial strip is provided in such a way that both dark partial strips directly and without spacing flank, e.g. abut, the bright partial strips. In this case the control unit uses a signature comprising a first dark beginning, a first dark end, a second dark beginning, and a second dark end, where the bright beginning coincides with the first dark end, and the bright end coincides with the second dark beginning. The result is an additional bright-dark transition, which increases the detection reliability. The contrast strip is readily manufactured in a simple manner by applying the bright partial strip over a dark substrate.

In an advantageous further development the contrast strip exhibits a periodic structure that extends in its transverse direction. This structure can be used to monitor the position of the contrast strip.

The control unit is designed preferably to detect significant points of the periodic structure like minima, zero positions or turning points. Such significant points characterize the contrast strip with few data points. This means less memory and evaluation complexity are needed.

The control unit advantageously files the significant points in a memory during a teaching phase, compares significant points determined during use of the device, and recognizes a deviation as a manipulation of the contrast strip. The significant points are effortlessly used to monitor the position of the contrast strip. Thus, manipulations can be detected in a fast and reliable manner.

The control unit preferably emits a warning and/or shut-off signal upon entry or manipulation of the object. This feature is very important for safety engineering when the monitored area protects a hazardous zone, for example the area around a machine, such as an automatic assembly machine or a robot, which could injure the operating personnel.

Advantageously an illumination system is provided for the monitored area, and the bright partial strip is a reflector, in particular a retro-reflector. The device is therefore significantly less dependent on ambient lighting because the light of the illumination system supplies the major portion of the light that is received.

The inventive method can be improved in a similar manner and offers similar advantages as is in part set forth, for example, in the dependent method claims.

The invention is explained in detail below even with respect to additional features and advantages, using as an example the embodiments, and with reference to the attached drawings.

DESCRIPTION OF THE PREFERRED EMBODIMENTS

Figure 1:
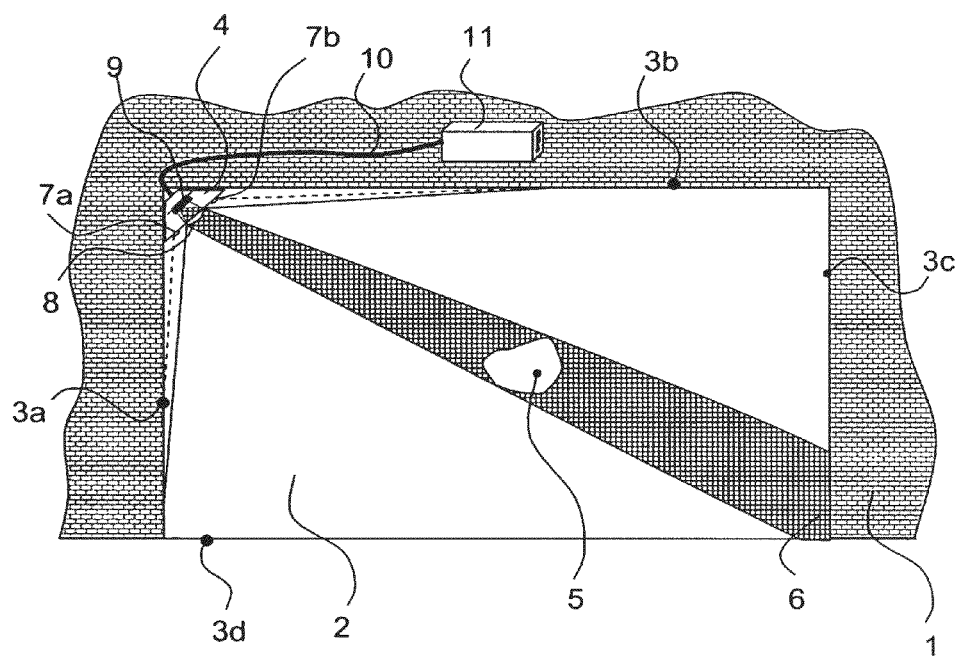
FIG. 1 schematically illustrates an arrangement for monitoring in accordance with the invention.

FIG. 1 is a schematic overview of one embodiment of the invention. A partition 1 has an aperture 2 which is defined by marginal areas 3a-3d. A camera 4 in one corner of aperture 2 takes a picture of the two opposite marginal areas 3c, 3d. In the drawing the camera 4 has an aperture angle greater than 90° and therefore also captures portions of marginal areas 3a, 3b. In order to monitor the entire passage aperture 2, the marginal areas 3c, 3d suffice as the monitored area. However, depending on the application, a subsection may also suffice.

The camera 4 monitors whether an object 5 is located in the passage aperture 2. Such an object 5 changes the image captured by the camera. Without the presence of an object 5 the camera image would show an undisturbed shaded area 6 of the monitored zone.

Two illumination systems 7a, 7b are arranged next to the camera 4. Two or more illumination systems 7a, 7b can also be symmetrically arranged relative to camera 4. However, one illumination system would also suffice. Even though any light source can principally be used, semiconductor light sources that emit targeted strips of light are especially suited. Of course, it is also possible to couple the illumination system into the optical axis of the camera 4 by means of a beam splitter or by any other known method. The important factor is that the zone or area to be surveyed by the camera 4 is illuminated.

Camera 4 has an optical objective 8 and a spatially resolving image sensor 9. The image sensor can be based on CMOS or CCD technology or on any other known arrangement for delivering images. The image is transmitted over a data line 10 to an evaluation unit 11 at the repeat frequency required by the application. The evaluation unit 11 is connected to the illumination systems 7a, 7b for controlling their light output. The evaluation unit 11 has information about the image captured by the camera 4 when no object 5 is located in aperture 2 and can detect its presence from the changes in the data of the image sensor 9 when an object 5 is present in the aperture. This process is explained in more detail in conjunction with FIG. 3.

Thus, the camera 4 monitors aperture 2 with respect to objects 5. One application is the presence of a hazardous area behind aperture 2—for example, a press or some other machine which can injure persons. Upon entry into aperture 2, a warning signal can be generated or the machine can be shut off. However, the system of the invention can also be used as an anti-theft device. In such case unauthorized persons are not allowed to enter the area behind aperture 2 even though no hazard is associated with the area as is the case when the arrangement is used as a protective device. The applications are not limited to these examples. The device can be used wherever the entry of an object is to be detected. Even the special arrangement in aperture 2 is only an example. The monitored area does not have to be, as shown in FIG. 1, half of a passage aperture 2, but rather can be any area at any location.

Figure 2:
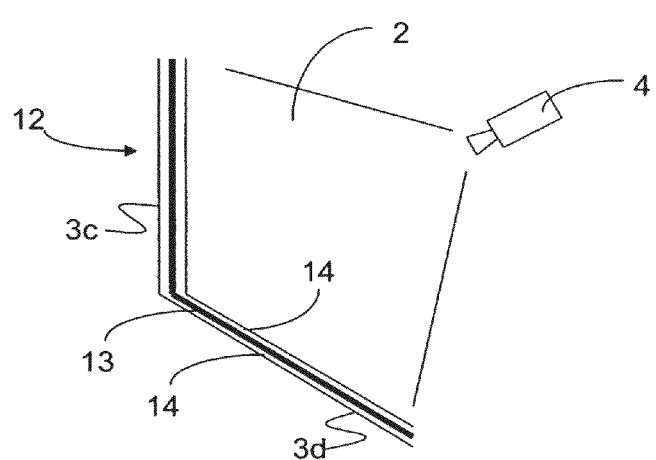
FIG. 2 is a partial, three-dimensional detail of the arrangement shown in FIG. 1.

FIG. 2 again shows a three-dimensional detail of the device. Due to the changed perspective of the drawing, camera 4 now views the monitored zone from the right. This monitored zone has a reflector foil 12, which in the illustrated embodiment has a central retro-reflecting or, as an alternative, just a bright partial strip 13, which is flanked by two parallel non-reflecting or dark partial strips 14. The contrast strip 12 does not necessarily have to be elongated, e.g. be a straight line. The strip could also be curved. However, this introduces an additional complexity and requires additional effort because for evaluation the curve must be transformed into a line or the line must be tracked with a two-dimensional algorithm.

Furthermore, the use of dark partial strips 14 is not mandatory. Depending on the design and requirements, the background itself can be used as a dark partial strip 14 in relation to the reflector. Conversely, the background can be bright relative to a dark partial strip, in which event the background functions as a bright partial strip 13. In either case the result is a high dynamic difference between the dark partial strip 14 and/or the background, and the bright or reflector material of the partial strip 13. This allows a robust evaluation even when external light is present, or between the background and a dark material of the dark partial strip 14. As explained below in conjunction with FIGS. 3 and 4, the partial strips 13, 14 have a structure; in FIG. 2 they are illustrated in an oversimplified manner as a smooth strip.

In another embodiment of the invention a second reflector structure can be provided which defines a warning zone or area. A penetration of the warning area initially only triggers an alarm signal. If the additional (first) reflector structure is overstepped due to a penetration of the actual protective field, a shut-off signal is sent to the protected system.

Figure 3:
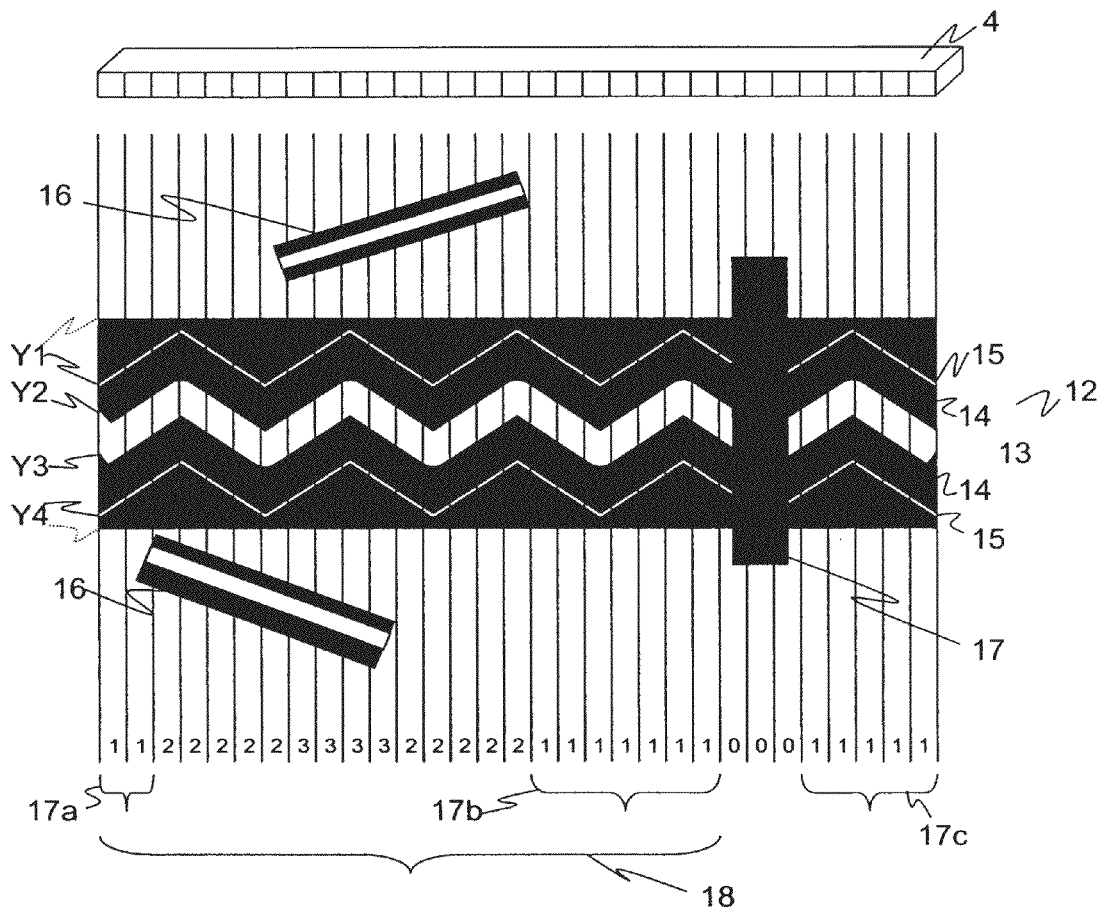
FIG. 3 is a schematic view of a contrast strip according to the present invention and illustrates the teaching and learning of the signature and the inventive evaluation of obscurations.

The evaluation method is described with reference to FIG. 3. In accordance with the invention, evaluation unit 11 ascertains whether an object 5 is located in the monitored area. According to a further aspect of the invention evaluation unit 11 can ascertain as a second check whether contrast strip 12 has been manipulated. For a second check the partial strips 13, 14 of the contrast strip 12 have a zigzag pattern configuration, the function of which will be explained below with reference to FIG. 4.

Prior to the use of the object detection, the position and structure of contrast strip 12 is taught in a teaching phase. For this, the matrix-shaped pixel data of the camera 4 are evaluated column by column. Only one pixel line of camera 4 is shown. Each pixel has the width of a column depicted by vertical lines in FIG. 3. The three-dimensional illustration of camera 4 is to indicate that each column has a multiplicity of pixels depending on the resolution of the camera 4, and not just the illustrated single pixel per column.

Initially the evaluation unit 11 has to detect the contrast strip 12 inside the viewing window of camera 4. The evaluation unit knows the characteristic signature of the contrast strip, that is, a dark-bright-dark transition, as shown for each column in FIG. 3 from the first dark partial strip 14 to the bright partial strip 13 to the dark partial strip 14. For purposes of this application, the word "bright" refers to gray scales above a bright threshold, and the word "dark" refers to gray scales below a dark threshold. A transition from one to the other must have an adequate signal amplitude between the two.

The thin white line 15 is not a part of the contrast strip 12 that is used. Apart from the bright partial strip 13, the dark partial strip 14 does not have any bright areas. Line 15 is simply meant to indicate that the dark partial strip 14 ends either parallel to the bright partial strip 13 as a zigzag line or, if line 15 is deleted, as a smooth edge. These are merely two possible examples of the type of border that the contrast strip 12 may have because this edge is not factored into the evaluation since it is not a part of the signature.

Instead of a contrast strip 12 with a dark-bright-dark transition, the contrast strip can have other transitions, such as bright-dark-bright or the like. In principle, a dark-bright transition suffices. However, a reflector can transfer such a transition to a limited extent only, because both sides of the reflector strip include a bright-dark transition. To avoid this situation, the reflector would have to be continued two-dimensionally to the edge of the viewing window of the camera 4. However, one of these two almost always present transitions could be ignored in the evaluation process.

The evaluating unit 11 looks initially in each column for transitions corresponding to the signature. To this end, a first minimum number of adjacent dark pixels must be followed by a second minimum number of adjacent bright pixels, which in turn are followed by a third minimum number of dark pixels. In the extreme case one pixel suffices as the minimum number. However, to avoid reacting to minute soiling, at a minimum there should be at least a few pixels. More complicated criteria are possible. For example, a group of adjacent pixels should have at least a minimum number of pixels having the requisite bright or dark characteristic. In this manner, individual pixel soiling or the like would not interfere with the evaluation.

Such transitions for the signature extend transversely to the contrast strip 12 in every column. However, transitions can also be caused by objects 16 located in the viewing field. Objects 16 do not have to have clearly defined bright and dark strips as shown in the drawing for the signature to be recognized. Depending on the minimum numbers for the pixels to be detected and the threshold values for dark and bright, a simple bright or dark object can suffice.

Evaluation unit 11 counts for each column how often the signature was recognized. In the column on the left in FIG. 3 this involves only contrast strip 12 itself, that is, a "1" (which is shown on the bottommost line). In the adjacent column the signature of object 16 is incomplete. Hence, only contrast strip 12 is counted as "1". In the next five columns the signature of the lower object 16 and that of the contrast strip 12 can be recognized and counted as "2". In the next four columns, the upper object 16 also appears, generating a count of "3", etc. In columns 6-8 of FIG. 3, counted from the right, a dark test rod 17 covers the contrast strip 12. Hence, in this case "0" signatures are counted.

In the next step the areas 17a-17c, where the signature was counted only once, are searched. Areas 17a-17c do not have any unwanted object 16 in the viewing field. From areas 17a-17c the longest area 17b is selected. It is maximally extended to the right and the left, that is, to the right as far as test rod 17 and to the left as far as the edge of the contrast strip 12, in order to find the largest monitored area 18. The test rod 17 defines the maximum extent of monitored area 18 because it covers contrast strip 12 and the signature does not continue past the test rod to the right. If test rod 17 were removed and the learning mode were repeated, then the entire contrast strip 12 would be found and the monitored area 18 could be expanded to its maximum.

As an alternative for determining the maximum monitored area, not just the longest area 17b, some or all of the subareas 17a-17c, and not just the longest area 17b, are extended to the right and to the left as far as possible. In so doing, the subareas 17a and 17b define the maximum monitored area 18; the subarea 17c cannot be further extended. Following their extension, the subparts are compared to determine which is the largest. This is again the maximum monitored area 18, which is larger than the area 17c.

This alternative method is somewhat more complicated because more extensions have to be calculated. However, it has the advantage that the maximum monitored area 18 is found even when the initially assumed largest area 17b is "misleading" because following the extension a different subarea became larger. This method also works even when it does not initially define a single subarea but, instead, a plurality of largest subareas, all of which are simply extended. When no unequivocally maximum monitored area 18 is produced, one of the possible maximum monitored areas 18 is selected and/or a warning is generated.

Finally the evaluation unit 11 stores those values Y1-Y4 of every column where transitions to bright partial strips 13 and/or dark partial strips 14 in contrast pattern strip 12 were recognized. The result is a table of 4× (column number of the maximum monitored area) values. In the resolution of camera 4 this table contains all of the relevant information about the contrast pattern strip 12.

In use, following completion of the teaching phase, objects are detected as follows. Each column within the maximum monitored area 18 is checked whether a minimum number of pixels is dark between Y1 and Y2, a minimum number of pixels is bright between Y2 and Y3, and a minimum number of pixels is dark between Y3 and Y4. The required minimum numbers can be taken from the teaching phase or they can be determined in an analogous manner. If not all pixels between Yn and Y(n−1) must be bright and/or dark, a tolerance range for soiling or similar sources of error is provided. Small tolerances to shifts are possible, in which event the values Y1-Y4 can deviate by a few pixels from the taught values.

In use, a column without the signature detected as above described is classified as (partially) obscured. When several adjacent columns are obscured so that the width of the columns exceeds a pre-established object size, evaluation unit 11 detects the presence of an object 5 and reacts to it, for example, by generating a warning or shut-off signal.

The described evaluating principle is not restricted to the illustrated vertical columns. The signature is insensitive to a twisting of the contrast strip 12 in relation to camera 4 over a wide range of angles. It is also possible to intentionally use slanted columns, but this requires a greater effort due to the increased complexity of the evaluation process in a pixel matrix.

Depending on a certain twist angle that is a function of the zigzag pattern, several signatures are detected within a column. At the latest, this is the case when the "columns" are horizontal. In such an event, the teaching method has to be adapted. However, a characteristic signature remains that can be stored over a larger number of values Y1 ... Yn, n>4. The present invention can be used in such a case.

Figure 4:
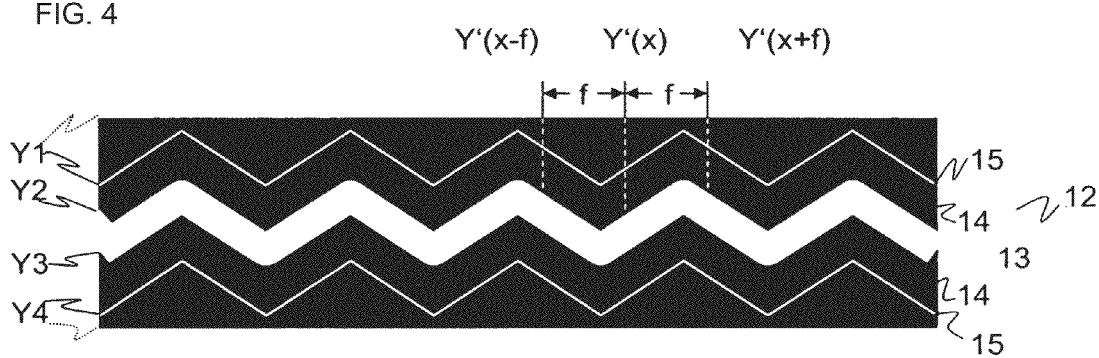
FIG. 4 is a top view of the contrast strip of the present invention and illustrates the inventive detection of manipulations and/or movements of the contrast strip pursuant to the invention.

FIG. 4 illustrates a second, independent evaluation procedure with which a manipulation of the contrast strip 12 can be detected by the evaluation unit 11. It uses a pattern of the contrast strip 12 that goes beyond mere bright-dark transitions. A zigzag pattern is employed in which a dark partial strip 14 is arranged essentially parallel (section by section) on both sides of the bright partial strip 13 between the dark strips. However, any other pattern can be used. Due to the simpler evaluation procedure, the pattern is preferably periodic, such as a wave, a trapezoidal or a sinusoidal curve or the like.

In a teaching phase, significant points of the pattern of the contrast strip 12 are determined and stored. Significant points include zero positions, turning points or other uniquely definable extreme points of the pattern. The term "zero position" refers in a very general way to reaching a fixed Y due to an otherwise arbitrary offset in the Y direction. When the pattern is symmetrical to an X axis, the axis of symmetry can be selected as the offset or "0". The progression of the pattern is known from the teaching phase for the object detection that was described in connection with FIG. 3. The values Y1 from a digital function of the number of columns from which the significant points can be determined with known methods of analysis (it is sufficient to look at Y1, since Y2 ... Y4 describe the same periodic pattern parallel-shifted and, thus, could be used as well).

In use, the significant points are determined once again in an analogous manner. To this end, the values Y1, which may have changed following manipulation, have to be determined again as Y'. A comparison of the momentarily significant points determined in this manner, with the significant points stored in the teaching phase, uncovers a manipulation of the contrast strip 12. The comparison can detect changes in the individual significant points as well as their periods, that is, the distance between them. In this context, the word "manipulation" refers to any change in position, irrespective of whether it was caused by an operator or resulted from material phenomena, like warping, sagging, etc.

Referring to FIG. 4, in use, significant points are detected as follows. The half period f of the pattern of the contrast strip 12 is at least approximately known from the teaching phase. Values Y'(x) are determined for each column x where a transition from the bright partial strip 13 to the upper dark partial strip 14 has been detected.

At this point the following function H(x) is defined:

$$H(x)=2*Y'(x)-(Y'(x+f)+Y'(x-f)).$$

H(x) has a periodic course with the period of the pattern of the contrast strip 12 but no mean value. After suitable smoothing the zero positions of H(x) are readily determined. The zero positions are the significant points of Y'(x) and therefore also of the pattern of strip 12 itself. With H(x), an exemplary implementation of the fast and reliable detection of the significant points is achieved.

In summary the invention performs two independent evaluations on a common contrast strip 12 wherein the pattern is evaluated against a taught pattern.

The first evaluation detects an object based on the pattern progression dark-bright-dark transverse to contrast strip 12. The pattern progression is verified at every location and in every column in the image of the camera 4. In the event of an unauthorized intervention in the monitored area the optical beam path between the illumination system 7a, 7b, the reflector 14 (or the contrast strip 12) and the camera 4 is influenced, e.g. changed, by an object 5. In such a case, the signature of the contrast strip 12 can no longer be detected. This is one way for detecting the field violation of a protective area that leads to generating a warning or shut-off signal.

In addition, the device must detect any attempt to manipulate or interfere with contrast strip 12. This is achieved by selecting a suitable periodic pattern that makes it possible to monitor the position and the distance of contrast strip 12. The second evaluation method evaluates the periodic progression of the pattern of the contrast strip 12 and at the same time reliably detects whether the contrast strip was shifted or its distance from the camera has changed. This second manipulation evaluation is independent of the object detection and can by itself lead to generating a warning or shut-off signal.

Thus, both evaluations enter into the decision whether a warning or shut-off signal should be generated. Safety engineering considerations prefer an inclusive OR operation, but other evaluations are of course possible. This includes performing only an object detection or only a manipulation detection.

Both evaluations use the same contrast strip 12 and are operative at comparatively low optical resolutions up to the theoretical limit of one pixel per bright partial strip 13 and/or dark partial strip 14 (in the Y direction) and two pixels in the X direction per period (no meaningful period can be defined with only one pixel).

The position detection of the manipulation evaluation is based on a plurality of pixels in the relatively nearer environment. This results in relatively high insensitivities to vibrations and soiling. The amplitude of the periodic pattern of contrast strip 12 advantageously breaks through the discretization when the optical system exhibits a low resolution.

What is claimed is:

1. A device for monitoring a monitored area with at least one camera comprising:
   a contrast strip in the monitored area which has at least one bright partial strip and/or
   a control unit configured to detect an obscuration of a minimum area of the bright partial strip and/or the dark partial strip caused by entry of an object into the monitored area, the control unit further being configured to:
   learn and file in memory during a teaching phase a signature for the contrast strip, the signature comprising a bright beginning, a bright end, and the number of bright pixels between the bright beginning and the bright end of the bright partial strip, and a dark beginning, and a dark end and the number of dark pixels between the dark beginning and the dark end of the dark partial strip for each column arranged in a transverse direction to the contrast strip,
   recognize the obscuration of each column as a violation of the signature of the contrast strip by detecting in each column a first minimum number of bright pixels between a bright beginning and a bright end of the bright partial strip and/or a second minimum number of dark pixels between a dark beginning and a dark end of the dark partial strip in the respective columns, and, compare said first minimum number of bright pixels and/or second minimum number of dark pixels with the signature of the contrast strip, wherein an obscuration of the minimum area is recognized when a predetermined number of columns that lie side by side are obscured, and wherein the control unit is further configured to determine, in the teaching phase, the signature of the contrast strip as follows:

for each column, count how often there exists a signature having the bright beginning, the bright end, the dark beginning and the dark end, to thereby determine a signature count for each column, identify a portion of area of the contrast strip which has the most side-by-side columns with a signature count of exactly one, and select an extended portion of the area of the contrast strip, the extended portion including the portion with the most side-by-side columns with a signature count of exactly one and further including all adjacent columns with a signature count of one or more, wherein the extended portion terminates at two ends of the extended portion, each end being defined by either an edge of the contrast strip or by a column with a signature count of zero.

2. A device according to claim 1, wherein the control unit is further configured to determine, in the teaching phase, the signature of the contrast strip as follows:

for each column, count how often there exists a signature having the bright beginning, the bright end, the dark beginning and the dark end, to thereby determine a signature count for each column, identify areas of the contrast strip which have side-by-side columns with a signature count of exactly one, for each area which has side-by-side columns with a signature count of exactly one, define an extended area, the extended area including the area which has side-by-side columns with a signature count of exactly one and further including all adjacent columns with a signature count of one or more, wherein each extended area terminates at two ends of the extended area, each end being defined by either an edge of the contrast strip or by a column with a signature count of zero, and thereafter select the longest one of the extended areas.

3. A device according to claim 1, further comprising an additional dark partial strip, wherein both dark partial strips directly flank the bright partial strip without any space between them, and wherein the control unit is configured to use a signature comprising a first dark beginning, a first dark end, a second dark beginning and a second dark end, and wherein the bright beginning coincides with the first dark end, and the bright end coincides with the second dark beginning.

4. A device according to claim 1, wherein the contrast strip comprises a periodic structure in its transverse direction.

5. A device according to claim 4, wherein the control unit is configured to detect significant points of the periodic structure including one or more of minima, zero positions and turning points.

6. A device according to claim 5, wherein the control unit is configured to store significant points in a memory during the teaching phase, to compare the stored significant points with significant points established during use, and to recognize a deviation as a manipulation of the contrast strip.

7. A device according to claim 1, wherein the control unit is configured to emit a warning and/or shut-off signal upon entry or a manipulation of an object.

8. A device according to claim 1, further comprising an illumination system for the monitored area, wherein the bright partial strip is one of a reflector or a retro-reflector.

9. A method for monitoring a monitored area with at least one camera and an evaluating unit, comprising:

placing a contrast strip in the monitored area which has at least one bright partial strip and/or at least one dark partial strip extending in a longitudinal direction;

taking a picture with the camera;

detecting an entry of an object into the monitored area based on an obscuration of a minimum area of the bright partial strip and/or the dark partial strip;

learning and storing in memory during a teaching phase a signature for the contrast strip, the signature comprising a bright beginning, a bright end, and the number of bright pixels between the bright beginning and the bright end of the bright partial strip, and a dark beginning, and a dark end and the number of dark pixels between the dark beginning and the dark end of the dark partial strip for each column arranged in a transverse direction to the contrast strip recognizing, in the picture taken by the camera, obscurations of each columns that extends transverse to the contrast strip; by detecting the obscurations of each column, as a violation of a signature of the contrast strip, a first minimum number of bright pixels between a bright beginning and a bright end of the bright partial strip in the respective columns and/or a second minimum number of dark pixels between a dark beginning and a dark end of the dark partial strip in the respective columns, comparing said first minimum number of bright pixels and/or second minimum number of dark pixels with the signature of the contrast strip, and, recognizing an obscuration of a minimum area when a predetermined number of columns that lie side by side are obscured;

wherein the determining takes place in the evaluating unit, and wherein determining the signature of the contrast strip during the teaching phase comprises:

for each column, counting how often there exists a signature having the bright beginning, the bright end, the dark beginning and the dark end, to thereby determine a signature count for each column, identifying a portion of the contrast strip which has the most side-by-side columns with a signature count of exactly one, and selecting an extended portion of the area of the contrast strip, the extended portion including the portion with the most side-by-side columns with a signature count of exactly one and further including all adjacent columns with a signature count of one or more, wherein the extended portion terminates at two ends of the extended portion, each end being defined by either an edge of the contrast strip or by a column with a signature count of zero.

10. A method according to claim 9, wherein determining the signature of the contrast strip during the teaching phase comprises:

for each column, counting how often there exists a signature having the bright beginning, the bright end, the dark beginning and the dark end, to thereby determine a signature count for each column, identifying areas of the contrast strip which have side-by-side columns with a signature count of exactly one, for each area which has side-by-side columns with a signature count of exactly one, defining an extended area, the extended area including the area which has side-by-side columns with a signature count of exactly one and further including all adjacent columns with a signature count of one or more, wherein each extended area terminates at two ends of the extended area, each end being defined by either an edge of the contrast strip or by a column with a signature count of zero, and thereafter selecting the longest one of the extended areas.

11. A method according to claim 9, wherein the contrast strip further comprises an additional dark partial strip, wherein both dark partial strips directly flank the bright partial strip without any space between them; and wherein the signature comprises a first dark beginning, a first dark end, a second dark beginning, and a second dark end, the bright beginning coinciding with the first dark end, and the bright end coinciding with the second dark beginning.

12. A method according to claim 9, further comprising giving the contrast strip a periodic structure in its transverse direction and detecting significant points of the periodic structure including one or more of minima, zero positions, or turning points.

13. A method according to claim 12, further comprising determining the significant points during a teaching phase, comparing significant points detected during use with the significant points determined during the teaching phase, and recognizing a deviation between them as a manipulation of the contrast strip.

14. A method according to claim 9, further comprising generating a warning signal and/or a shut-off signal upon the detection of an entry or a manipulation of the object.

15. The device of claim 1, wherein each column has a width in the longitudinal direction of at least one pixel, and a length in the transverse direction of a plurality of pixels.

16. The method of claim 9, wherein each column has a width in the longitudinal direction of at least one pixel, and a length in the transverse direction of a plurality of pixels.

17. The device of claim 1, wherein the control unit is further configured to operate in two modes, a teaching mode and an operating mode.

18. The method of claim 9, wherein the control unit is further configured to operate in two modes, a teaching mode and an operating mode.

\* \* \* \* \*